United States Patent
Al-Shafei et al.

(10) Patent No.: US 11,066,606 B2
(45) Date of Patent: Jul. 20, 2021

(54) SYSTEMS AND METHODS FOR CATALYTIC UPGRADING OF VACUUM RESIDUE TO DISTILLATE FRACTIONS AND OLEFINS WITH STEAM

(71) Applicant: SAUDI ARABIAN OIL COMPANY, Dhahran (SA)

(72) Inventors: Emad Naji Al-Shafei, Dhahran (SA); Mohamed Al-Bahar, Dhahran (SA); Ali Nader Al-Jishi, Dhahran (SA); Ki-Hyouk Choi, Dhahran (SA); Ali Al-Nasir, Dhahran (SA); Mohammad Al-Jishi, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/681,517

(22) Filed: Nov. 12, 2019

(65) Prior Publication Data
US 2021/0139793 A1    May 13, 2021

(51) Int. Cl.
*C10G 11/05* (2006.01)
*C10G 47/16* (2006.01)
(Continued)

(52) U.S. Cl.
CPC ............ *C10G 47/16* (2013.01); *B01J 8/02* (2013.01); *B01J 29/40* (2013.01); *B01J 29/7684* (2013.01);
(Continued)

(58) Field of Classification Search
CPC ......... C10G 11/00; C10G 11/02; C10G 11/04; C10G 11/05; C10G 47/16;
(Continued)

(56) References Cited

U.S. PATENT DOCUMENTS

| 3,954,600 A | 5/1976 | Gladrow et al. |
| 4,172,816 A | 10/1979 | Boteanu et al. |

(Continued)

FOREIGN PATENT DOCUMENTS

| CN | 100537714 C | 9/2009 |
| CN | 108264935 A | 7/2018 |

(Continued)

OTHER PUBLICATIONS

Galadima, A. et. al, Hydrocracking catalysts based on hierarchical zeolites: A recent progress, Journal of Industrial and Engineering Chemistry, 2018, 265-280.

(Continued)

*Primary Examiner* — Michelle Stein
(74) *Attorney, Agent, or Firm* — Constance Gall Rhebergen; Bracewell LLP

(57) ABSTRACT

Systems and methods for upgrading a heavy oil feed to a light product comprising distillate fractions and olefins, the method including combining a heavy oil feed with a naphtha-based cracking additive to produce a mixed heavy oil feed; heating the mixed heavy oil feed with a nano-zeolite catalyst in the presence of steam to effect catalytic upgrading of the mixed heavy oil feed to produce lighter distillate fractions and olefins in an upgraded product, the upgraded product including at least about 30 wt. % olefins; and separating the lighter distillate fractions from the olefins.

20 Claims, 3 Drawing Sheets

(51) Int. Cl.
*B01J 8/02* (2006.01)
*B01J 29/40* (2006.01)
*B01J 29/76* (2006.01)
*B01J 38/02* (2006.01)

(52) U.S. Cl.
CPC .......... *B01J 29/7692* (2013.01); *B01J 38/02* (2013.01); *C10G 2300/1044* (2013.01); *C10G 2300/1074* (2013.01); *C10G 2300/1077* (2013.01); *C10G 2300/301* (2013.01); *C10G 2300/308* (2013.01); *C10G 2300/807* (2013.01); *C10G 2400/20* (2013.01)

(58) Field of Classification Search
CPC ...... C10G 2300/1074; C10G 2300/807; C10G 2300/308; C10G 2400/20
See application file for complete search history.

(56) References Cited

U.S. PATENT DOCUMENTS

| | | | |
|---|---|---|---|
| 4,340,465 A | | 7/1982 | Miller et al. |
| 4,886,934 A | * | 12/1989 | Maxwell ............... C10G 11/05 585/660 |
| 4,976,847 A | | 12/1990 | Maxwell et al. |
| 4,980,053 A | * | 12/1990 | Li ........................ C10G 11/16 208/120.01 |
| 5,278,114 A | * | 1/1994 | Wielers ................ C10G 11/05 502/67 |
| 5,326,465 A | | 7/1994 | Yongqing et al. |
| 6,210,562 B1 | | 4/2001 | Xie et al. |
| 6,211,104 B1 | | 4/2001 | Shi et al. |
| 6,420,621 B2 | | 7/2002 | Sha et al. |
| 6,743,961 B2 | | 5/2004 | Powers |
| 7,033,486 B2 | | 4/2006 | Gorbaty et al. |
| 7,404,889 B1 | | 7/2008 | Powers |
| 7,550,642 B2 | | 6/2009 | Powers |
| 8,137,534 B2 | | 3/2012 | Upson et al. |
| 8,696,887 B2 | | 4/2014 | Xu et al. |
| 9,212,318 B2 | | 12/2015 | Narayanaswamy et al. |
| 9,228,140 B2 | | 1/2016 | Abba et al. |
| 9,284,497 B2 | | 3/2016 | Bourane et al. |
| 9,284,502 B2 | | 3/2016 | Bourane et al. |
| 9,382,486 B2 | | 7/2016 | Bourane et al. |
| 9,428,695 B2 | | 8/2016 | Narayanaswamy et al. |
| 9,670,418 B2 | | 6/2017 | Schmidt et al. |
| 10,407,311 B2 | | 9/2019 | Ding et al. |
| 2003/0181323 A1 | | 9/2003 | Le |
| 2004/0004022 A1 | | 1/2004 | Stell et al. |
| 2004/0054247 A1 | | 3/2004 | Powers |
| 2005/0209495 A1 | | 9/2005 | McCoy et al. |
| 2008/0093261 A1 | | 4/2008 | Powers |
| 2010/0213102 A1 | * | 8/2010 | Xu ........................ C10G 11/05 208/69 |
| 2011/0000819 A1 | | 1/2011 | Keusenkothen |
| 2016/0333280 A1 | | 11/2016 | Subramani et al. |
| 2017/0166819 A1 | | 6/2017 | Choi et al. |
| 2017/0369397 A1 | * | 12/2017 | Al-Herz ............... B01J 35/023 |
| 2018/0002609 A1 | | 1/2018 | Narayanaswamy et al. |
| 2018/0216009 A1 | | 8/2018 | Narayanaswamy et al. |
| 2018/0333708 A1 | * | 11/2018 | Ding ...................... C10G 47/20 |
| 2018/0334390 A1 | | 11/2018 | Ding et al. |
| 2019/0023997 A1 | | 1/2019 | Sundaram |
| 2020/0291306 A1 | * | 9/2020 | Aitani ................. C10G 51/026 |

FOREIGN PATENT DOCUMENTS

| | | |
|---|---|---|
| DE | 152356 A1 | 11/1981 |
| WO | 0132806 A1 | 5/2001 |

OTHER PUBLICATIONS

Genquan, et al.; Research and Commerical Application of CPP Technology for Producing Light Olefins from Heavy Oil; China Petroleum Processing and Petrochemical Technology; Sep. 30, 2013, pp. 7-12; vol. 15, No. 3.
U.S. Appl. No. 16/681,513, "Systems and Methods for Catalytic Upgrading of Vacuum Residue to Distillate Fractions and Olefins", filed Nov. 12, 2019.
International Search Report and Written Opinion, PCT Application No. PCT/US2020/059816, dated Feb. 15, 2021.
International Search Report and Written Opinion, PCT Application No. PCT/US2020/059815, dated Feb. 10, 2021.

* cited by examiner

SYSTEMS AND METHODS FOR CATALYTIC UPGRADING OF VACUUM RESIDUE TO DISTILLATE FRACTIONS AND OLEFINS WITH STEAM

BACKGROUND

Field

The present disclosure relates to systems and methods for upgrading vacuum residue in addition to or alternative to vacuum gas oil to distillate fractions and olefins. Specifically, the disclosure presents high temperature catalytic upgrading systems and methods for upgrading vacuum residues to distillate fractions and olefins applying a naphtha-based cracking additive and steam.

Description of the Related Art

Direct upgrading of de-metalized and de-asphalted oils from vacuum residue and heavy gas oil is a problematic and challenging process for integrated refineries, preventing production of highly valuable products such as olefins. Hydrocracker processes are important for the production of clean fuels in refineries, and full conversions of vacuum gas oil (VGO) mixed with some de-metalized oil (DMO) has been achieved. However, limited yields of highly valuable olefins are obtained. Thermal cracking based on carbon rejection techniques in coker units is utilized to convert heavy feedstocks, but low olefin yields are usually obtained, accompanied by high yields of coke. Conventional fluidized catalytic cracking (FCC) processes involve a catalytic pyrolysis process, and are mainly applied for converting VGO. FCC is not designed to be directly used to convert vacuum residue feedstocks. Moreover, a high catalyst to oil ratio is required.

Converting vacuum residue to more valuable products should be considered by refineries so that low value products can be turned into more valuable products for petrochemical industries. State of the art technologies for processing vacuum residues include using carbon rejection or hydrogen addition processes. Carbon rejection is a useful process, but produces low content of olefins and allows for coke formation. Hydrocracking processes provide for full conversion of heavy feedstocks to various clean fuels. However, limited yield of olefin gas is produced from the upgrading processes of VGO, de-asphalted oil (DAO), and DMO.

Technologies such as high-severity fluidized catalytic cracking (HS-FCC) and deep catalytic cracking (DCC) are processes for vacuum gas oil conversion, producing olefins and distillate fractions. Yet, these technologies show limited conversion of vacuum residue feedstocks and are not utilized for such types of residue directly. Furthermore, steam cracking units have not been applied in any commercial petrochemical plant to convert vacuum residue feedstocks due to a high rate of coking from heavy carbon molecules and low yields of olefins.

Several technologies have attempted catalytic cracking using various catalysts without the introduction of any hydrogen to the system for the conversion of heavy residue feedstocks to more valuable products. Overall, most state of the art technology discloses FCC reactor configurations and several catalysts in order to conduct upgrading of heavy residues. However, these processes require micro-sized zeolite crystals modified with a variety of additives and metals. Also, high catalyst to oil ratios are used, despite steam introduction to FCC reactors.

Zeolite catalysts play an important role in any hydrocarbon catalytic cracking process despite the different preparation methods, modifications, and reactor configurations. Conversion of heavy vacuum residue and heavy vacuum gas oil feedstocks is challenging, and integrated refineries face multiple difficulties utilizing and converting such heavy feedstocks. Converting these feedstocks by a hydrocracking unit will produce low olefin yields with high yields of clean fuel.

Performing thermal cracking on vacuum residue feedstocks in coker units produces low olefin yields alongside distillate products. In addition, the products are accompanied by large amounts of coke. Steam cracking units are usually utilized for upgrading naphtha and gas oil, but have not been used for vacuum residue upgrading due to the low yield of olefins and the high rate of coking. In addition, there is no commercial process based on FCC to be utilized for upgrading vacuum residue feedstocks, which are still considered to be challenging feeds to produce olefins and distillate fractions.

Steam cracker units in various petrochemical plants utilizes several feedstocks, such as ethane, propane, naphtha, and gas oil to produce olefins. Yield and distribution of olefin products depends, in part, on the type of feed and cost of available feedstock. In addition, severe operating cracking temperature and short residence times in the furnace are important to avoid coke formation and increase olefins yield.

One of the heaviest feeds used in industrial steam crackers is gas oil, and it produces ethylene (about 15-23 wt. %), propylene (about 14 wt. %), and butenes (about 11 wt. %). As noted, however, there are no commercially-available steam cracking processes tailored for handling heavy vacuum feedstock due to high coking rate and low yield of olefins.

SUMMARY

Applicant has recognized a need for systems and methods that upgrade de-metalized and de-asphalted oil from vacuum residue in addition to or alternative to vacuum gas oil to produce valuable distillate fractions and olefins. In certain embodiments disclosed here, high temperature steam catalytic upgrading systems and processes are disclosed for heavy and light vacuum gas oil and for de-metalized and de-asphalted oils from vacuum residues, which produce valuable distillate fractions and olefins. Embodiments of systems and methods show upgrading heavy or light vacuum gas oils or vacuum residues, or any mixtures thereof, by mixing the heavy vacuum gas oils or vacuum residues with naphtha-based cracking additives, such as straight run naphtha, which is used as diluent, and steam.

Disclosed embodiments enhance catalyst activity and help effectively crack heavier molecules in a heavy feed either on the external surfaces or the inner pores of nano-zeolite catalyst crystals. Steam catalytic systems and processes convert vacuum gas oil and vacuum residues to olefins and hydrogen. This is achieved, in part, by minimizing hydrogenation reactions via thermal catalytic processes with nano-zeolites. Suppressed hydrogenation reactions are believed to limit the production of saturated hydrocarbon gases, such as methane, from the thermal catalytic process. Certain embodiments include the usage of a selected diluent, which is mixed with a heavy feed and steam. Exemplified embodiments with optional fixed bed catalysts show enhanced yield of olefins.

Disclosed systems and processes, without being bound by any theory or practice, are believed to reduce hydrogenation reactions by limiting consumption of hydrogen radicals as intermediate by-products, which in turn inhibits the saturation reactions of olefins. Reduced hydrogenation occurs using thermal catalytic reactions over nano-zeolite catalysts. Diluent mixed with heavy feedstock achieves a higher yield of olefins as well as produces an excess amount of hydrogen. Systems and processes are designed to overcome conversion limitations when upgrading heavy residue feedstocks by applying reduced hydrogenation processes to convert such heavy feedstocks to olefins gas, hydrogen, and distillate fractions.

In certain embodiments, steam is injected before, with, in addition to or alternative to after a mixed heavy feed with diluent for conversion to olefins. Straight run light distillation fractions in addition to or alternative to gas condensates are used as diluent additives for heavy residues.

Selected nano-zeolite shaped catalyst with alumina is applied to assist in reducing hydrogenation reactions. The shaped nano-zeolite catalyst is highly-resistant to degradation in the presence of steam. Specifically-structured nano-zeolite catalysts provide shorter diffusion path lengths for chemical conversions. Produced small hydrocarbon molecules of olefins, produced by primary cracking, diffuse quickly preventing secondary hydrogenation reactions. Systems and processes disclosed therefore reduce the rate of hydrogenation reactions of the produced olefins from the primary cracking reactions. This is achieved by reducing and limiting intermediate hydrogen radicals that react with olefins.

During steam catalytic cracking processes, a reduction of secondary reactions between the cracked molecules also reduces coke formation from cracking. Higher cracking activity can be achieved during steam catalytic cracking over nano-zeolite catalyst by adding a diluent, which is mostly paraffinic, to the heavy hydrocarbon residue. A paraffinic diluent can be greater than 50 wt. %, 60 wt. %, 70 wt. %, 80 wt. %, or 90 wt. % paraffinic. During conversion reactions, hydrogen radicals from the diluent aid in further cracking of heavy hydrocarbons producing higher yields of olefins.

Reducing hydrogenation processes is not known to have been applied in fluidized catalytic cracking (FCC) processes, and here steam catalytic cracking is applied by using a fixed bed reactor, which provides longer conversion cycles, in the range of 3 to 8 hours per cycle. In certain embodiments, a catalyst to oil weight ratio from about 0.5:1 to about 0.5:10 is used, and this is much less than typical FCC processes (about 10:1 to about 40:1). Systems and processes enhance conversion of heavy residue feedstocks (such as DAO, DMO, heavy vacuum gas oil (HVGO), light vacuum gas oil (LVGO), and combinations thereof) as well as the selectivity of obtained products. Olefins are produced with high yield alongside lighter distillate fraction products.

Thermal catalytic cracking of vacuum gas oil generally suffers from high coking rate and high yield of saturated gases (methane, ethane, propane, and butane). These issues are encountered in both steam cracking and catalytic steam cracking processes. State of the art thermal catalytic cracking of vacuum residue produces low olefins content due to consumption of the intermediate hydrogen radicals, which are highly reactive and react rapidly with the intermediate olefin molecules leading to the production of undesired saturated gas products instead of the desired olefins.

By reducing hydrogenation reactions via systems and processes disclosed here, vacuum residue upgrading reactions are made to be selective towards olefins production. Limiting hydrogenation reactions in steam catalytic cracking of heavy feeds produces more hydrogen gas from hydrogen radical species as a byproduct, which reduces intermediate hydrogen radical species and prevents hydrogenation of olefins. To suppress hydrogenation reactions, activation energy is reduced via thermal catalytic reactions by applying selected process criteria and reactor conditions for vacuum feedstock cracking.

Embodiments disclosed here show the production of high olefin yield from vacuum gas oil conversion, in the range of about 40 wt. % to about 60 wt. % in the product stream. Processes can produce surpluses of hydrogen in the amount of about 6 wt. % to about 15 wt. % in the product stream. Systems and methods also advantageously produce distillate fractions from heavy feedstock conversions. Reducing activation energy of catalytic conversion, in part, led to decreasing amounts of saturated gases produced, by controlling hydrogenation processes during upgrading vacuum gas oil.

Systems and methods disclosed here can be advantageously applied to LVGO, HVGO, DMO of heavy vacuum residue, DAO of heavy vacuum residue, and DAO paraffins of heavy vacuum residue to produce high value products of olefins and distillate fractions. Reducing hydrogenation via steam thermal catalytic cracking to convert heavy vacuum feedstock from vacuum distillation products produces higher yields of olefins in the range of about 40 wt. % to about 60 wt. % or about 30 wt. % to about 70 wt. % and surplus hydrogen. The remaining products are generally distillate fractions including naphtha, kerosene, diesel, fuel oil, and other gas byproducts.

Systems and processes are designed to incorporate steam injection and diluent additive(s) based on straight run light distillation fractions or gas condensate and selected nano-zeolite catalyst(s) to overcome the limitations of state of the art technologies and obtain highly demanded products.

Certain systems and methods apply the use of a fixed bed reactor loaded with nano-zeolite catalysts. In addition, straight run naphtha can be used as a cracking additive to enhance the cracking activity of heavy molecules leading to the production of distillate fractions alongside lighter valuable olefins. Systems and methods are advantageous in utilizing heavy low value feedstocks to produce more valuable products. Certain systems and methods apply the use of a fixed bed reactor loaded with nano-zeolite catalysts. Systems can include the use of multiple bed reactor systems with a swing reactor concept wherein one reactor is removed from service for regeneration and a freshly regenerated reactor is simultaneously returned to service.

With the direct catalytic upgrading technology described here, efficient conversion of DMO, DAO, heavy vacuum gas oil, and other heavy vacuum gas residues to olefin and distillate fractions is achievable. Mixing these heavy feedstocks with a diluent beforehand allows for larger quantities of distillate fractions and olefins to be produced.

Nano-zeolite crystals with a low catalyst to oil weight ratio were used to overcome certain challenges associated with the conversion of heavy vacuum residue feedstocks for the production of high yields of light olefins and distillate fractions compared to established carbon rejection and hydrocracking processes. Vacuum residue feedstock is a difficult feedstock to handle and has not been utilized in the production of valuable chemicals such as BTX (benzene, toluene, and xylene) and light olefins due the low yield of these chemical that is obtained with state of the art technologies. In addition, vacuum residue has not been used as a feedstock for steam cracking units. Certain embodiments overcome the upgrading limitations of vacuum residues such as DMO, DAO, and heavy vacuum gas oil (HVGO) feedstocks. Embodiments of systems and methods are designed to be operated at atmospheric pressure without or in the absence of a supply of hydrogen. The catalytic upgrading systems and methods unexpectedly utilize lower catalyst to oil ratios than conventional FCC technology to convert vacuum residues to distillate fractions and olefins.

Residue from vacuum distillation contains the major portion of the asphaltene fraction of processed crude oil. Vacuum residue contains high concentrations of Conradson Carbon residue and metal components. It also contains high levels of heteroatoms such as nitrogen and sulfur. Vacuum residue generally cannot be used as feedstock for catalytic cracking because its high metal content leads to catalyst deactivation. Solvent de-asphalting of vacuum residue produces what is referred to as a DAO or DMO fraction of relatively low metal content and a heavier fraction containing the rest of the metals. Factors affecting this process are: vacuum residue and solvent quality, solvent/charge ratio (S/C), temperature and pressure.

The catalytic upgrading systems and methods can be operated for longer reaction cycles with slower deactivation rates than conventional FCC technologies for converting vacuum residues to distillate fractions and olefins.

With the cracking additive it is believed, without being bound by any theory or practice, that the internal pores of nano-zeolite catalysts produce intermediate by-product molecules. Then, these intermediate by-products react again, which increases the reactivity of the catalyst to assist in increasing the reaction rate of vacuum residue feedstock cracking mostly via external pores of the catalyst.

Thus, disclosed here is a method for catalytic upgrading of vacuum residues to distillate fractions and olefins, the method including combining a heavy oil feed with a naphtha-based cracking additive to produce a mixed heavy oil feed; heating the mixed heavy oil feed with a nano-zeolite catalyst in the presence of steam to effect catalytic upgrading of the mixed heavy oil feed to produce lighter distillate fractions and olefins in an upgraded product, the upgraded product including at least about 30 wt. % olefins; and separating the lighter distillate fractions from the olefins. In some embodiments, the heavy oil feed has an American Petroleum Institute (API) gravity between about 5 and about 22. In other embodiments, the heavy oil feed is selected from the group consisting of: de-asphalted oil, de-metalized oil, heavy vacuum gas oil, light vacuum gas oil, and combinations thereof. Still in certain other embodiments, the naphtha-based cracking additive comprises straight run naphtha with an API gravity from about 40 to about 77 and a boiling point range from between about 200° F. to 500° F.

Still in other certain embodiments, the naphtha-based cracking additive is selected from the group consisting of: straight run whole naphtha, straight run heavy naphtha, light straight run kerosene, gas condensates, and combinations of the same. In some embodiments, the naphtha-based cracking is added to be at between about 5 wt. % to about 30 wt. % of the weight of the mixed heavy oil feed. Still in other embodiments, the naphtha-based cracking additive is added to be at between about 10 wt. % to about 25 wt. % of the weight of the mixed heavy oil feed. In certain other embodiments, the step of heating is carried out at between about 550° C. to about 750° C. for between about 2 hours to about 6 hours. Still in other embodiments, the step of heating is carried out at between about 590° C. to about 610° C. for between about 3 hours to about 4 hours.

In some embodiments of the method, the nano-zeolite catalyst comprises at least one zeolite selected from the group consisting of: a nano ZSM-5 silica/alumina zeolite with zeolite crystals sized from about 50 to about 500 nm, a nano ZSM-22 silica/alumina zeolite with zeolite crystals sized from about 50 to about 500 nm, and a nano ZSM-23 silica/alumina zeolite with zeolite crystals sized from about 50 to about 500 nm. In other embodiments of the method, the lighter distillate fractions include at least one component selected from the group consisting of: naphtha, kerosene, diesel, and fuel oil. In some embodiments, the olefins include at least one component selected from the group consisting of: ethylene, propylene, and butenes. Other embodiments of the method include, the step of regenerating the nano-zeolite catalyst to remove coke after the step of heating, the step of regenerating comprising heating the nano-zeolite catalyst under air at between about 650° C. to about 750° C. for between about 3 hours to about 5 hours.

Still other embodiments include the step of measuring $CO_2$ content to determine completion of the step of regenerating the nano-zeolite catalyst. In certain embodiments, the step of combining includes stirring the heavy oil feed and naphtha-based cracking additive with a stirrer at between about 50 rpm and about 1500 rpm for between about 1 hour and about 2 hours. In other embodiments, the upgraded product comprises between about 5-15 wt. % hydrogen gas, about 30-70 wt. % olefin gas, and about 5-50 wt. % lighter distillate fractions. Still in yet other embodiments, the step of heating is carried out without hydrogen addition and with water addition to produce steam at about 2 to about 4 times the liquid hourly space velocity of the mixed heavy oil feed for steam. In some embodiments, the nano-zeolite catalyst to mixed heavy oil feed weight ratio is from about 0.5:4 to about 0.5:12. Still in other embodiments, the method includes a first step of separating the lighter distillate fractions from an aqueous phase and a second step of separating the lighter distillate fractions from an aqueous phase. In other embodiments, the first step of separating the lighter distillate fractions from the aqueous phase comprises the use of an inline centrifuge.

Additionally disclosed here is a system to carry out the various methods described, the system including a thermal mixing unit with a stirrer to adapted for the step of combining a catalytic upgrading unit in fluid communication with the thermal mixing unit and adapted for the step of heating; a gas-liquid separator unit adapted for the separating step; and an in-line centrifuge fluidly coupled to the gas-liquid separator to separate the lighter distillate fractions from an aqueous phase. In certain embodiments, the system includes a pump and a heated line between the thermal mixing unit and the catalytic upgrading unit. Still in other embodiments of the system, the catalytic upgrading unit is in fluid communication with a nitrogen feed and an air feed for a step of regenerating the nano-zeolite catalyst to remove coke. In certain embodiments, the catalytic upgrading unit comprises a fixed bed reactor with the nano-zeolite catalyst disposed in the fixed bed reactor.

Other embodiments include a liquid-liquid separator fluidly coupled to the in-line centrifuge and adapted to accept a separated aqueous phase comprising residual light distillates, where the liquid-liquid separator separates the residual light distillates from the separated aqueous phase.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are

DETAILED DESCRIPTION

So that the manner in which the features and advantages of the embodiments of systems and methods that provide heavy vacuum residue in addition to or alternative to vacuum gas oil catalytic upgrading with steam, as well as others, which will become apparent, may be understood in more detail, a more particular description of the embodiments of the present disclosure briefly summarized previously may be had by reference to the embodiments thereof, which are illustrated in the appended drawings, and which form a part of this specification. It is to be noted, however, that the drawings illustrate only various embodiments of the disclosure and are therefore not to be considered limiting of the present disclosure's scope, as it may include other effective embodiments as well.

Figure 1:
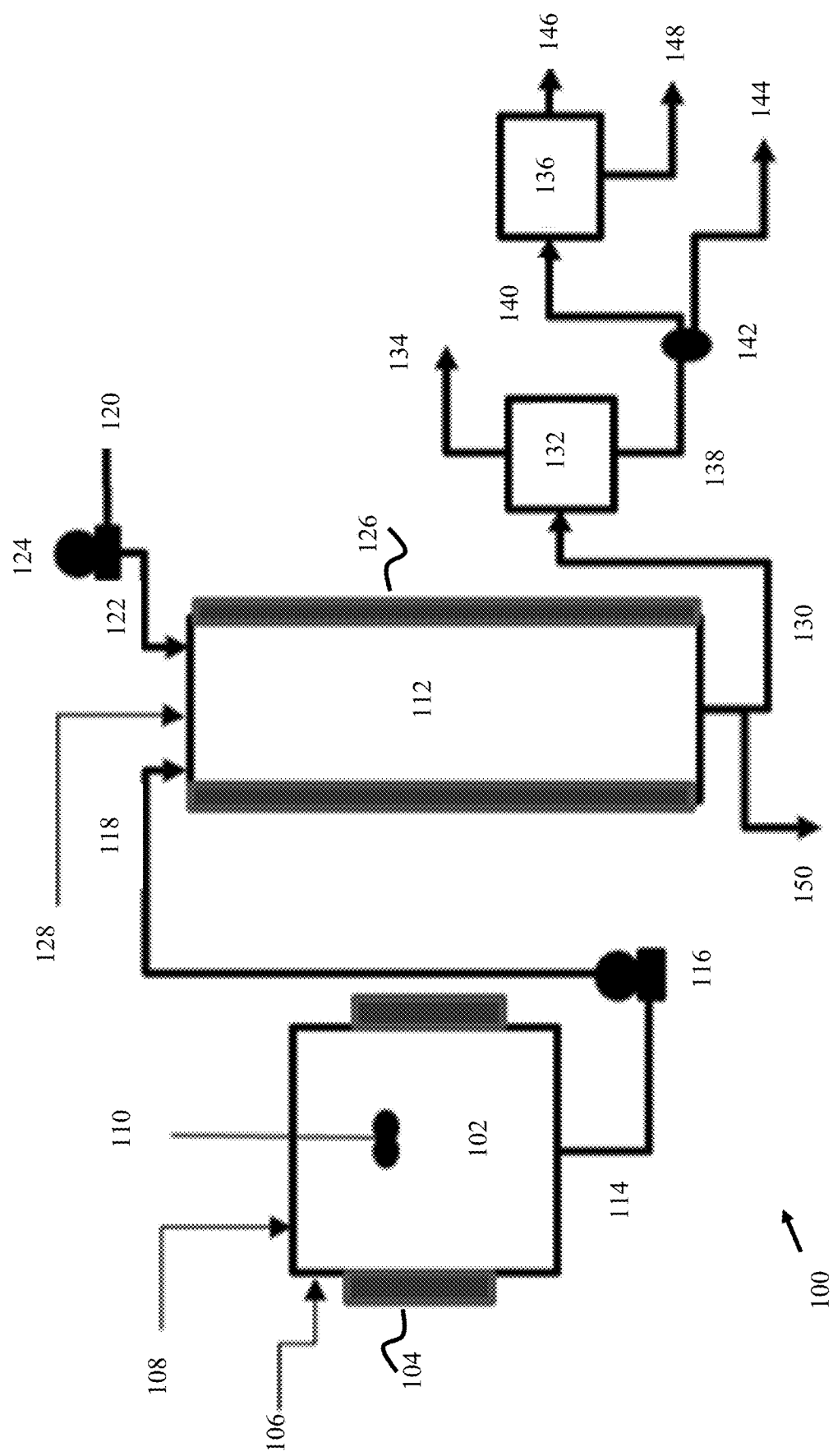
FIG. 1 is a schematic representing a reduced hydrogenation system and process for catalytic upgrading of heavy vacuum residues in addition to or alternative to vacuum gas oil using a nano-zeolite catalyst and cracking additive with steam and without hydrogen addition.

Referring first to FIG. 1, a schematic is shown representing a reduced hydrogenation system and process for catalytic upgrading of heavy vacuum residues in addition to or alternative to vacuum gas oil using a nano-zeolite catalyst and cracking additive with steam and without hydrogen addition. In steam catalytic upgrading system 100, a heavy feed preparation unit 102 is used to heat and mix heavy feedstock from vacuum distillation (products such as LVGO, HVGO, DMO, DAO, and mixtures thereof) with a diluent additive under pre-heating conditions. Prior to mixing of a heavy vacuum feedstock, the temperature of heavy feed preparation unit 102 is set to be between about 60° C. to about 150° C., or between about 70° C. to about 90° C. by using heating elements 104. A preheated vacuum feedstock is introduced to heavy feed preparation unit 102 via line 106. Line 106 is optionally a heated line to maintain an elevated temperature for vacuum feedstock such as LVGO, HVGO, DAO, DMO, or a combination thereof.

A diluent additive is added to heavy feed preparation unit 102 via line 108 before, during, or after addition of a heavy feedstock. Suitable diluent additives can include refinery light fractions in addition to or alternative to gas condensates, and the diluent additive is used to assist the heavy feedstock upgrading. A refinery light fraction used as a diluent additive can include a straight run whole naphtha (boiling point range of about 93° C. to about 157° C.), straight run heavy naphtha (boiling point range of about 157° C. to about 204° C.), or light straight run kerosene (boiling point range of about 204° C. to about 260° C.), or any combination thereof. Gas condensate can also be used as diluent additive, where the gas condensate includes mainly light naphtha, whole naphtha, and heavy naphtha, together making up about 60 wt. % to about 100 wt. % of the gas condensate. Systems and methods are adapted to comprise, consist of, or consist essentially of one light fraction diluent additive or comprise, consist of, or consist essentially of two, three, or more combined light fractions in order to make a diluent additive to be mixed with heavy feedstock.

The diluent additive is mixed from line 108 to be at an amount between about 10 vol. % to about 20 vol. % of the total volume of the mixed feedstock introduced into heavy feed preparation unit 102, or between about 5 wt. % to about 30 wt. % of the total weight of the mixed feedstock in heavy feed preparation unit 102. Either or both of lines 106, 108 can be preheated, for example, to about the temperature of heavy feed preparation unit 102.

Stirrer 110 is operated at a speed between about 50 rpm to about 400 rpm to mix the diluent additive with heavy feedstock before it is sent to the steam catalytic cracking unit 112. Mixed heavy feedstock with diluent additive is evacuated via preheated line 114, and the preheated line temperature is adjusted to between about 70° C. to about 90° C. Then, the feed is pumped via pump 116 and preheated line 118 at a temperature between about 150° C. to about 250° C. to steam catalytic cracking unit 112.

Pump 116 is adjusted to inject mixed heavy feedstock with diluent additive at a liquid hourly space velocity (LHSV) of between about 0.1 $h^{-1}$ to about 15 $h^{-1}$, or between about 0.25 $h^{-1}$ to about 3 $h^{-1}$.

Steam catalytic cracking unit 112 includes one or more selected catalyst tailored to assist in reducing hydrogenation reactions during catalytic processing. Optional suitable catalysts for incorporation into one or more catalyst bed are provided as follows. ZSM-5 nano-zeolite extruded with an alumina binder (between about 25 wt. % to about 60 wt. %). The nano-zeolite ZSM-5 has a molar silica/alumina ratio from between about 20 to about 200 and nano-crystal size in the range of between about 50 nm to about 500 nm. ZSM-22 nano-zeolite extruded with alumina binder (between about 25 wt. % to about 60 wt. %). The nano ZSM-22 has a molar silica/alumina ratio from between about 20 to about 200 with a crystal size in the range of between about 50 nm to about 500 nm. ZSM-23 nano-zeolite extruded with alumina binder (between about 25 wt. % to about 60 wt. %). The zeolite ZSM-23 has a molar silica/alumina ration of between about 20 to about 200 and a crystal size in the range of between about 50 nm to about 500 nm. In one embodiment, a suitable catalyst includes extrudates of nano ZSM-5 for use in steam catalytic cracking unit 112. In one embodiment, a suitable catalyst includes a combination of two catalysts based on extrudates of nano ZSM-5 mixed with nano ZSM-22 seeds in the wt./wt. ratios of about 1:1, about 1.5:0.5, or about 1.75:0.25. In one embodiment, a suitable catalyst includes a combination of two catalysts based on extrudates of nano ZSM-5 mixed with nano ZSM-23 based on the wt./wt. ratios of about 1:1, about 1.5:0.5, or about 1.75:0.25.

In some embodiments, a catalyst diluent, for example, silica carbide, is used and disposed proximate the top of one or more catalyst bed in steam catalytic cracking unit 112 to ensure appropriate heat transfer to the injected mixed heavy feedstock with diluent additive. In some embodiments, steam catalytic cracking unit 112 includes one or more fixed bed catalytic reactor units. Mixed heavy feedstock is introduced to steam catalytic cracking unit 112 via line 118 at a selected liquid hourly space velocity. Before, during, and/or after mixed heavy feedstock is introduced to steam catalytic cracking unit 112 via line 118, water is injected via lines 120, 122 by a feed pump 124 which adjusts the flow rate of water to achieve a liquid hourly space velocity of between about 0.2 $h^{-1}$ to about 30 $h^{-1}$. Pumped water proceeds via line 122 where it is pre-heated to between about 150° C. to about 250° C. before entering steam catalytic cracking unit 112.

Steam catalytic cracking unit 112 operates in a catalytic conversion mode at a temperature between about 550° C. to about 750° C. In one embodiment, steam catalytic cracking unit 112 is heated to between about 585° C. to about 615° C., for example about 600° C., by heating elements 126 under nitrogen flow from gas line 128 before introducing the mixture of heavy feed and water (steam). After about 5 to about 30 minutes, nitrogen gas injection is stopped, and both steam and heavy vacuum feedstock with diluent are fed at a selected liquid hourly space velocity to steam catalytic cracking unit 112. In some embodiments, the liquid hourly space velocity of steam is about two times to about four times that of the heavy vacuum feedstock with diluent.

In some embodiments, cracking of mixed heavy feedstock with diluent additive and steam will take between about 2 hours to about 6 hours per one cycle of conversion, or between about 3 hours to about 4 hours. Produced olefins, saturated gases, distillate fractions, and other products are evacuated via line 130 to gas-liquid separator unit 132. Following one or more conversion cycles, depending on coke deposition on catalyst and other factors, catalysts can be regenerated as follows. After evacuation of product from steam catalytic cracking unit 112, air in addition to or alternative to oxygen is introduced via gas line 128 at a gas hourly space velocity (GHSV) of between about 25 $h^{-1}$ to about 100 $h^{-1}$. The temperature of steam catalytic cracking unit 112 is increased to between about 650° C. to about 750° C. for between about 3 hours and about 5 hours. Gas produced from steam catalytic cracking unit 112 is analyzed, and once carbon dioxide detected is reduced to less than about 0.05 vol. % to about 0.1 vol. %, the reactor temperature is decreased from between about 650° C. to about 750° C. to about 600° C. $CO_2$ concentration in steam catalytic cracking unit 112 can be detected by an inline meter on, for example, line 150 or by sampling the atmosphere in unit 112 by any acceptable known means.

Once the reactor temperature reaches about 600° C. after catalyst regeneration, gas feed from line 128 is switched back to nitrogen in addition to or alternative to an inert gas for between about 30 to about 60 minutes. Then, the nitrogen and/or inert gas supply is stopped and another steam catalytic conversion cycle begins injecting heavy mixed feed with vacuum residue stock, diluent, and steam for a conversion cycle to produce olefins and distillate products.

Gas-liquid separator unit 132 cools the water/aqueous phase remaining from steam application and produced distillate from line 130, then separates gas products produced in steam catalytic cracking unit 112 from liquids. In some embodiments, gas-liquid separator unit 132 operates at a temperature less than about 15° C. to ensure that pentane with heavier hydrocarbons and water is liquefied is in a liquid phase. Obtained gases from steam catalytic cracking unit 112 include hydrogen, methane, ethane, ethylene, propane, propylene, butanes, butenes and other gases, which are sent for further gas separation treatment via line 134. Water and hydrocarbon distillate fractions are sent to liquid-liquid separator unit 136 via lines 138, 140 for further separation in order to capture distillate fractions and recycle water to be injected once again to steam catalytic cracking unit 112 (not pictured).

A mixed liquid phase comprising hydrocarbons and water passes through in-line centrifuge 142 to separate water from hydrocarbon distillate fractions, which are produced from upgrading the mixed heavy feedstock in steam catalytic cracking unit 112. A light phase of upgraded distillate fractions once separated proceeds via line 144. A heavier phase (aqueous water with mixed residual hydrocarbons) passes through line 140 to liquid-liquid separator unit 136 in order to separate any remaining distillate fractions via line 146 from an aqueous/water phase proceeding via line 148.

Distillate fractions collected from lines 144, 146 generally comprise naphtha, kerosene, diesel, and fuel oil combined at over about 50 wt. %, 60 wt. %, 70 wt. %, 80 wt. %, or 90 wt. % of the streams. An aqueous/water phase collected from the process via line 148 can be used in water recycling to be injected back to steam catalytic cracking unit 112 (not pictured).

The outlet for line 150 is closed off during upgrading and conversion. After evacuation of all produced hydrocarbons from steam catalytic cracking unit 112 via line 130, a catalyst regeneration stage to remove coke from the catalyst is commenced. Air in addition to or alternative to oxygen is introduced via line 128 to steam catalytic cracking unit 112, and line 150 is opened for regenerating the catalyst. Lines 118, 122, and 130 are closed. Steam catalytic cracking unit 112 heating increases, going from a temperature of about 600° C. to between about 650° C. and about 750° C. During catalyst regeneration, air, mixed gases, and $CO_2$ are vented out via line 150 and pass to gas analysis in order to measure the $CO_2$ content. In some embodiments, once $CO_2$ content is reduced to less than 0.1 vol. %, catalyst regeneration is stopped and a new hydrocarbon conversion cycle begins.

In embodiments of the present disclosure, heavy feed preparation unit 102, steam catalytic cracking unit 112, gas-liquid separator unit 132, and liquid-liquid separator unit 136 can be operated at atmospheric pressure or greater.

Example 1

Vacuum residue of paraffinic deasphalted oil (DAO) has an American Petroleum Institute (API) gravity of about 21. DAO is heavy and has a boiling point range between about 737° F. to about 1300° F. DAO has a 35 wt. % 1050° F. or greater boiling point residue content as shown by simulated distillation (SIMDIS) analysis in Table 1. DAO of vacuum residue was used for olefin production via a reduced hydrogenation steam catalytic cracking process, similar to that shown in FIG. 1. A steam catalytic cracking process was applied using a nano-zeolite catalyst extruded with 40 wt. % alumina binder. DAO was blended with straight heavy naphtha as a diluent at 120° C., the straight heavy naphtha being 20 wt. % of the total mixture. The steam catalytic cracking was conducted in a fixed bed reactor at 600° C. The hydrocarbon feed was injected at a liquid hourly space velocity of 1 $h^{-1}$. Water for steam was injected at a liquid hourly space velocity of 2 $h^{-1}$. The oil to water volume ratio used in this conversion of DAO to olefin was about 1:2.

The implementation of a steam catalytic cracking reduced hydrogenation process achieved high conversion of DAO vacuum residue and high yield of olefins (64 wt. %) with distillate fractions as shown in Table 2. The produced olefins consisted of propylene (32.2 wt. %), ethylene (18.9 wt. %), and butenes (13.3 wt. %). In addition, distillate fractions of naphtha, kerosene, diesel, and fuel oil were obtained. The steam catalytic cracking reduced hydrogenation process produced a propylene to ethylene (P:E) weight ratio of 1.7. The process produced hydrogen surplus in the range of 10 wt. %.

TABLE 1

SIMDIS and distillation fractions of DAO from vacuum residue for Example 1.

| Cut wt.% | DAO feed Boiling Point, ° F. |
|---|---|
| 0 | 737.3 |
| 5 | 876 |
| 10 | 925 |
| 20 | 970.7 |

TABLE 1-continued

SIMDIS and distillation fractions of DAO from vacuum residue for Example 1.

| Cut wt.% | DAO feed Boiling Point, ° F. |
|---|---|
| 30 | 997.6 |
| 40 | 1019.6 |
| 50 | 1040.1 |
| 60 | 1061.4 |
| 70 | 1086.4 |
| 80 | 1118.1 |
| 90 | 1166.7 |
| 95 | 1207.1 |
| 100 | 1298.6 |

TABLE 2

Products from conversion of blended DAO in Example 1.

| Product | Wt. % |
|---|---|
| Naphtha | 4.2 |
| Kerosene | 2.7 |
| Diesel | 2.4 |
| Fuel oil % | 4.0 |
| $H_2$ | 10.0 |
| Ethylene | 18.9 |
| Propylene | 32.2 |
| Butenes | 13.3 |
| Coke | 1.9 |

| Cut wt. % | Boiling Point, ° F. |
|---|---|
| IBP | 167.3 |
| 5 | 247.7 |
| 10 | 284.2 |
| 20 | 313.9 |
| 30 | 349.1 |
| 40 | 397.4 |
| 50 | 482 |
| 60 | 567 |
| 70 | 642.6 |
| 80 | 721.2 |
| 90 | 812.7 |
| 95 | 889.8 |
| FBP | 1091.7 |

Example 2

Figure 2:
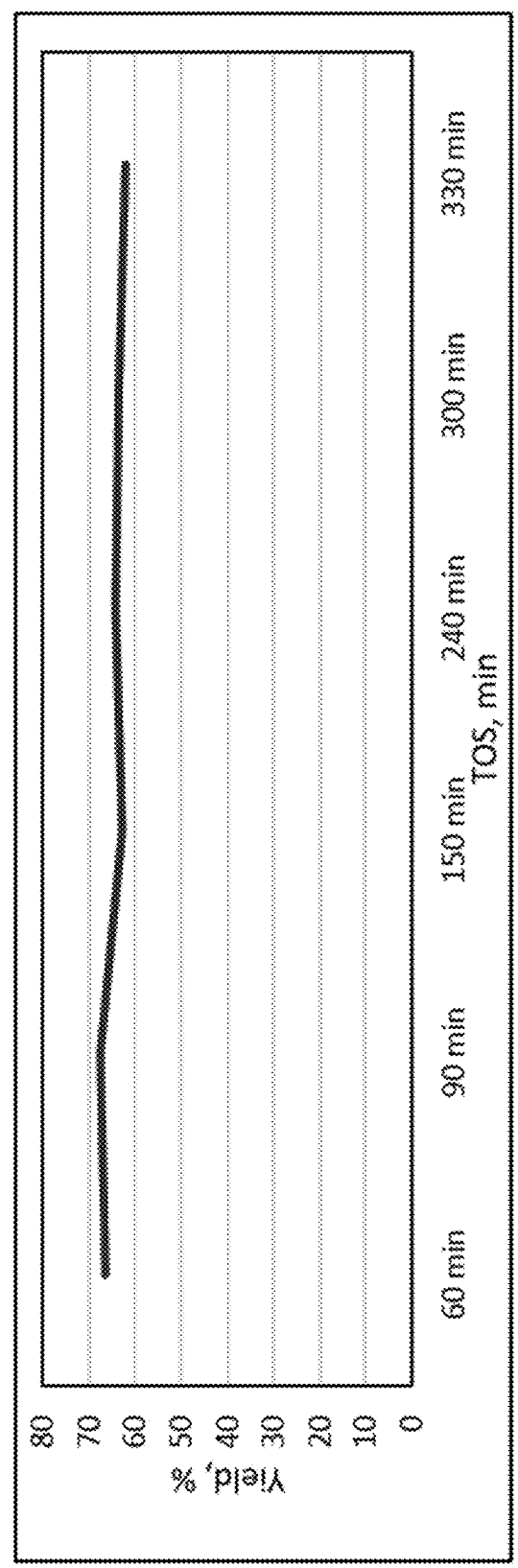
FIG. 2 is a graph showing produced olefins yield from DAO against time-of-stream (TOS) as a result of a reduced hydrogenation steam catalytic cracking process.

According to Example 1, the steam catalytic cracking reduced hydrogenation process was performed for 330 minutes on a stream as one conversion cycle and showed high performance and stability sustaining high olefins yield around 60 wt. % (see FIG. 2).

Example 3

DMO of vacuum residue with an API of 15 is a heavy feed where 90 wt. % has a boiling point above about 925° F. DMO generally has a 45 wt. % residue content with a boiling point greater than about 1050° F. as shown by SIMDIS analysis in Table 3. DMO contains heavier molecules and more condensed aromatics than heavy vacuum gas oil. DMO from vacuum residue was utilized for olefins production by implementing steam catalytic conversion reduced hydrogenation processes through the utilization of steam catalytic cracking over extruded nano-zeolites with 40 wt. % alumina binder. DMO was blended with straight heavy naphtha and mixed at 120° C., the straight heavy naphtha being 20 wt. % of the total mixture. Steam catalytic cracking was conducted in a fixed bed reactor at 600° C. The hydrocarbon feed and steam feed were injected at liquid hourly space velocities of 1 h$^{-1}$ and 2 h$^{-1}$, respectively. The oil to water volume ratio used in the process of converting DMO to olefins was about 1:2.

The implementation of a steam catalytic cracking reduced hydrogenation process achieved high conversion of DMO from vacuum residue and high yield of olefins (about 42 wt. %) with lighter distillate fractions as shown in Table 4. The produced olefins included propylene at 20.2 wt. %, ethylene at 11.9 wt. %, and butenes at 9.5 wt. %. In addition, lighter distillate fractions of naphtha, kerosene, diesel and fuel oil were obtained. The steam catalytic cracking reduced hydrogenation process produced a P:E weight ratio of 1.7. The process produced hydrogen surplus in the range of 9.2 wt. %.

TABLE 3

SIMDIS and distillation fractions of DMO from vacuum residue for Example 3.

| Cut wt. % | DMO feed Boiling Point, ° F. |
|---|---|
| 0 | 794.4 |
| 5 | 894 |
| 10 | 937.6 |
| 20 | 989.8 |
| 30 | 1028.9 |
| 40 | 1062.2 |
| 50 | 1094.3 |
| 60 | 1127.3 |
| 70 | 1164.1 |
| 80 | 1207.8 |
| 90 | 1268.3 |
| 95 | 1306.5 |
| 100 | 1360.2 |

TABLE 4

Products from converting DMO blended with straight run heavy naphtha in Example 3.

| Product | Wt. % |
|---|---|
| Naphtha | 7.0 |
| Kerosene | 5.0 |
| Diesel | 5.4 |
| Fuel oil % | 17 |
| $H_2$ | 9.2 |
| Ethylene | 11.9 |
| Propylene | 20.2 |
| Butenes | 9.5 |
| Coke | 2 |

| Cut wt. % | Boiling Point, ° F. |
|---|---|
| IBP | 182.6 |
| 5 | 266.6 |
| 10 | 304.1 |
| 20 | 348.2 |
| 30 | 430.4 |
| 40 | 536.9 |
| 50 | 623.3 |
| 60 | 704.8 |
| 70 | 781.6 |
| 80 | 863.8 |
| 90 | 957.3 |
| 95 | 1021.4 |
| FBP | 1190.1 |

Example 4

Figure 3:
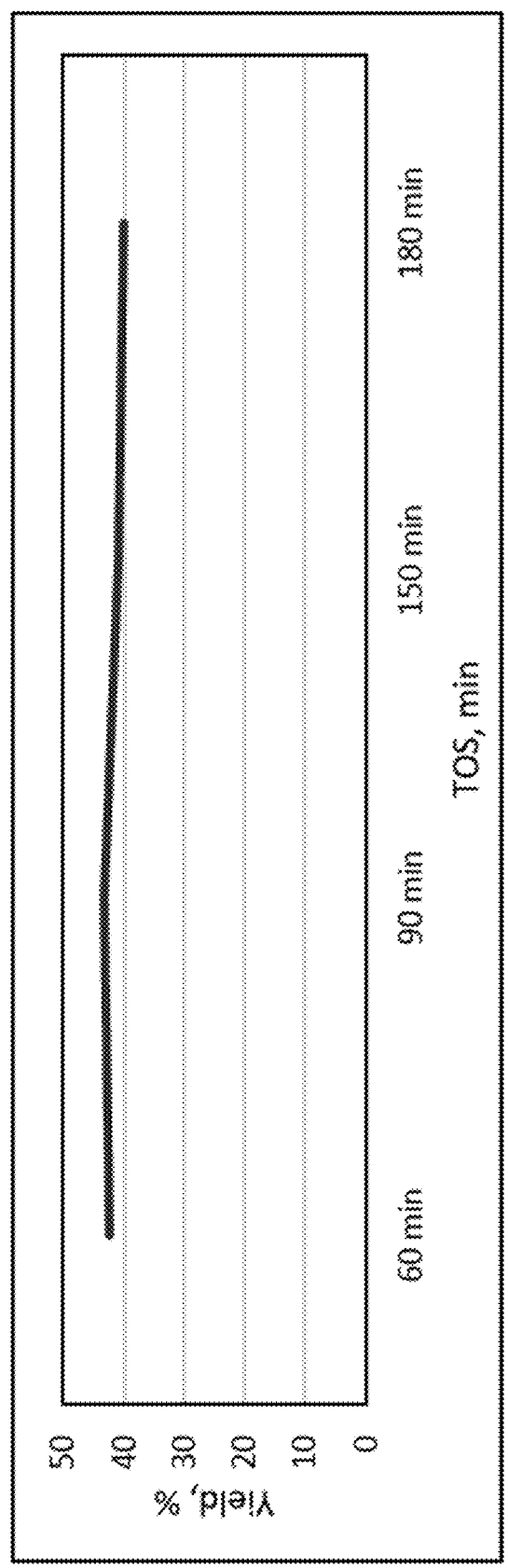
FIG. 3 is a graph showing produced olefins yield from DMO against TOS as a result of a reduced hydrogenation steam catalytic cracking process.

According to Example 3, the steam catalytic cracking reduced hydrogenation process was performed for 180 minutes on a stream as one conversion cycle and showed high performance and stability sustaining high olefins yield around 40 wt. % (see FIG. 3). In some embodiments, systems and embodiments can be run in a batch mode. In other embodiments, the process is continuous process in which the feed and water are injected via continuous flow by using two liquid pumps for continuously injecting water and heavy feedstock for cracking and upgrading the heavy feedstock.

Steam catalytic cracking with reduced hydrogenation of the present disclosure is a process suitable for converting heavy vacuum feedstocks (including any one of or any combination of LVGO, HVGO, DAO, and DMO) to olefins with hydrogen surplus and distillate fractions. Systems and methods include a heavy feed preparation unit for mixing heavy feedstocks with selected diluents. Systems and methods also include a steam catalytic cracking unit for steam assisted cracking over extruded nano-zeolite catalysts.

In some embodiments of the systems and methods described, the yield of olefins produced is in the range of about 30 wt. % to about 70 wt. %, or about 40 wt. % to about 60 wt. % of a produced product stream. In certain embodiments, the olefins comprise, consist of, or consist essentially of ethylene, propylene, and butenes, the butenes including trans-2-butene, 1-butene, isobutylene, and cis-2-butene. In some embodiments, surplus hydrogen is produced in the range of about 5 wt. % to about 15 wt. % from a steam catalytic cracking reduced hydrogenation process.

In some embodiments, systems and processes produce distillate fractions in the range of about 5 wt. % to about 50 wt. %, or about 10 wt. % to about 40 wt. % of a produced product stream. In some embodiments, the distillate fractions comprise, consist of, or consist essentially of naphtha, kerosene, gas oil, and fuel oil fractions.

In some embodiments, steam catalytic cracking reduced hydrogenation systems and processes can convert at least one feedstock or a combination of two or three heavy feedstocks of light vacuum gas oil (LVGO), heavy vacuum gas oil (HVGO), de-metallized oil (DMO) of vacuum residue, deasphalted oil (DAO) of vacuum residue or deasphalted oil (DAO) of atmospheric residue to produce high value products. Either or both of heavy vacuum reside of DAO or DMO can be mixed with between about 10 wt. % to about 70 wt. %, for example 20 wt. %, 30 wt. %, 40 wt. %, 50 wt. %, or 60 wt. % of either or both of LVGO or HVGO to mix a heavy feedstock for conversion. The systems and processes are flexible for feed type and will suit a variety of refinery products.

In some embodiments, for example FIG. 1, a heavy feed preparation unit mixes at least one or at least two, or more, diluents, such as refinery straight run light fractions in addition to or alternative to gas condensate, with one or more vacuum residue feedstock.

In some embodiments a diluent additive comprises any one of or any combination of straight run whole naphtha (with a boiling point range of about 93° C. to about 157° C.), straight run heavy naphtha (with a boiling point range of about 157° C. to about 204° C.), or straight run light kerosene (with a boiling point range of about 204° C. to about 260° C.). In some embodiments, a gas condensate used for a diluent additive comprises between about 60 wt. % to about 100 wt. % of a combination of light naphtha, whole naphtha, and heavy naphtha. In some embodiments, a heavy feed preparation unit mixes vacuum feedstock (such as any one of or any combination of LVGO, HVGO, DMO, or DAO) with diluent additive under pre-heating conditions at a temperature between about 60° C. to about 150° C., or between about 70° C. to about 120° C.

In some embodiments, a total heavy feedstock and diluent additive mixture comprises between about 5 wt. % to about 30 wt. % diluent additive, and in some embodiments a total heavy feedstock and diluent additive mixture comprises between about 15 wt. % to about 25 wt. % diluent additive. In certain embodiments, a heavy feed preparation unit applies stirring at a speed between about 50 rpm to about 1500 rpm, or between about 200 rpm to about 500 rpm, to mix a diluent additive with vacuum feedstock before sending it to a steam catalytic cracking unit. In certain embodiments, a mixed heavy feedstock with a diluent additive is delivered to a pump via an optionally preheated line at a temperature between about 70° C. to about 150° C., and then the mixed heavy feedstock with a diluent additive is delivered to a steam catalytic cracking unit via the feed pump which injects the feed mixture to the reactor via another preheated line at a temperature between about 150° C. to about 250° C.

In some embodiments, a feed pump injects mixed heavy feedstock with a diluent additive to a steam catalytic cracking unit at liquid hourly space velocity of about 0.1 $h^{-1}$ to about 15 $h^{-1}$, or a space velocity between about 0.25 $h^{-1}$ to about 3 $h^{-1}$.

In some embodiments, a steam catalytic cracking unit includes one or more fixed bed reactor loaded with one or more selected catalyst to assist in steam catalytic cracking with reduced hydrogenation. Steam catalytic cracking catalysts can include nano-zeolites extruded with between about 25-60 wt. % alumina binder. In some embodiments, suitable nano-zeolite extrudates are made from ZSM-5 with a silica/alumina molar ratio of about 20 to about 200 with a crystal size in the range of about 50 nm to about 500 nm. In other embodiments, suitable nano-zeolite extrudates are made from ZSM-23 with a silica/alumina molar ratio of about 20 to about 200 and with a crystal size in the range of about 50 nm to about 500 nm. In some embodiments, selected nano-zeolite extrudates are made from ZSM-22 with a silica/alumina molar ratio of about 20 to about 200 with a crystal size in the range of 50 nm to about 500 nm. In some embodiments, selected nano-zeolite extrudates comprise two combined nano-zeolites, for example, nano ZSM-5 and nano ZSM-23 zeolite with weight ratios of about 1.25:0.75, about 1.5:0.5, or about 1.75:0.25.

Still in other embodiments, selected nano-zeolite extrudates comprise two combined nano-zeolites, for example, nano ZSM-5 and nano ZSM-22 zeolite with weight ratios of about 1.25:0.75, about 1.5:0.5, or about 1.75:0.25. In some embodiments, a catalyst diluent comprising silica carbide is used for a catalyst bed to ensure proper heat transfer to the injected heavy mixed feedstocks. In some embodiments, water is injected to a steam catalytic cracking unit before, during, or after injection of a mixed heavy feed comprising vacuum residue or vacuum gas oil with a liquid hourly space velocity in the range of about 0.5 $h^{-1}$ to about 20 $h^{-1}$, or between about 1 $h^{-1}$ to about 5 $h^{-1}$ via a pre-heated line at a temperature between about 150° C. to about 250° C.

A steam catalytic cracking reactor for reduced hydrogenation of mixed heavy feeds can operate in the temperature range between about 500° C. to about 750° C., or in the temperature range between about 550° C. to about 650° C. In some embodiments, once the reactor temperature of a steam catalytic reactor with a fixed catalyst bed reaches about 600° C., both steam and mixed heavy vacuum feedstock with diluent additive are introduced at selected liquid hourly or gas hourly space velocity ratios. In some embodiments, the liquid hourly space velocity of water (for steam) is about two times or greater than the space velocity of the heavy vacuum feedstock mixed with diluent. In some embodiments, cracking heavy vacuum feedstock with a diluent proceeds in a single cycle for between about 2 hours to about 6 hours, completing one conversion cycle where after the catalyst is regenerated. In certain embodiments, one conversion cycle proceeds for between about 3 to about 4 hours, before stopping the injection of steam and heavy hydrocarbon.

In certain embodiments steam catalytic cracking reduced hydrogenation processes use a catalyst to oil (heavy hydrocarbon plus diluent) weight ratio from between about 0.5:4 to about 0.5:12 per one process conversion cycle. The regeneration process of spent catalysts is carried out by introducing air to the steam catalytic cracking unit after evacuating all hydrocarbon liquid and gas products from the reactor. The regeneration process is performed with GHSV between about 25 $h^{-1}$ to about 100 $h^{-1}$ and at a temperature from about 650° C. to about 750° C. for between about 3 hours to about 5 hours.

In some embodiments, a nano ZSM-5 zeolite is synthesized from a silica source which includes tetraethylorthosilicate (TEOS), silica gel, colloidal silica 30 wt. %, colloidal silica 40 wt. %, fumed silica, or combinations thereof. Also, a zeolite template can be applied, which is one embodiment is tetrapropylammonium hydroxide. Silica gel is mixed with a template such as tetrapropylammonium hydroxide, which is important for structure formation of MFI-ZSM-5 structure as well as crystallization. In some embodiments, nano ZSM-5 zeolite crystals are made from different silica sources and are mixed before binding with alumina binder.

The catalytic upgrading systems and processes are directed at upgrading DMO, DAO, HVGO, LVGO, or combinations thereof, to produce distillate fractions, olefins, and hydrogen gas as the main products. Heavy vacuum residue, HVGO, LVGO or a combination can be mixed with a cracking additive to prepare the feed prior to catalytic upgrading reactions. The cracking additive applied in catalytic upgrading processes can comprise, consist of, or consist essentially of straight run naphtha having a total sulfur content from 0.01% to 1% wt. %, API gravity from about 40 to about 77 and a boiling point range from between about 200° F. to 500° F.

The term "about" when used with respect to a value or range refers to values including plus and minus 5% of the given value or range.

The singular forms "a," "an," and "the" include plural referents, unless the context clearly dictates otherwise.

In the drawings and specification, there have been disclosed embodiments of systems and methods of a cracking additive used with steam and nano-zeolite catalyst to catalytically upgrade a heavy vacuum residue in addition to or alternative to a heavy vacuum gas oil in addition to or alternative to a light vacuum gas oil, and although specific terms are employed, the terms are used in a descriptive sense only and not for purposes of limitation. The embodiments of the present disclosure have been described in considerable detail with specific reference to these illustrated embodiments. It will be apparent, however, that various modifications and changes can be made within the spirit and scope of the disclosure as described in the foregoing specification, and such modifications and changes are to be considered equivalents and part of this disclosure.

What is claimed is:

1. A method for upgrading a heavy oil feed to a light product comprising distillate fractions and olefins, the method comprising the steps of:
   combining a heavy oil feed with a naphtha-based cracking additive to produce a mixed heavy oil feed;
   heating the mixed heavy oil feed with a nano-zeolite catalyst in the presence of steam to effect catalytic upgrading of the mixed heavy oil feed to produce lighter distillate fractions and olefins in an upgraded product, the upgraded product including at least about 30 wt. % olefins; and
   separating the lighter distillate fractions from the olefins, where the nano-zeolite catalyst to mixed heavy oil feed weight ratio is from about 0.5:1 to about 0.5:12.

2. The method according to claim 1, where the heavy oil feed has an American Petroleum Institute (API) gravity between about 5 and about 22.

3. The method according to claim 1, where the heavy oil feed is selected from the group consisting of: de-asphalted oil, de-metalized oil, heavy vacuum gas oil, light vacuum gas oil, and combinations thereof.

4. The method according to claim 1, where the naphtha-based cracking additive comprises straight run naphtha with an API gravity from about 40 to about 77 and a boiling point range from between about 200° F. to 500° F.

5. The method according to claim 1, where the naphtha-based cracking additive is selected from the group consisting of: straight run whole naphtha, straight run heavy naphtha, light straight run kerosene, gas condensates, and combinations of the same.

6. The method according to claim 1, where the naphtha-based cracking is added to be at between about 5 wt. % to about 30 wt. % of the weight of the mixed heavy oil feed.

7. The method according to claim 1, where the naphtha-based cracking additive is added to be at between about 10 wt. % to about 25 wt. % of the weight of the mixed heavy oil feed.

8. The method according to claim 1, where the step of heating is carried out at between about 550° C. to about 750° C. for between about 2 hours to about 6 hours.

9. The method according to claim 1, where the step of heating is carried out at between about 590° C. to about 610° C. for between about 3 hours to about 4 hours.

10. The method according to claim 1, where the nano-zeolite catalyst comprises at least one zeolite selected from the group consisting of: a nano ZSM-5 silica/alumina zeolite with zeolite crystals sized from about 50 to about 500 nm, a nano ZSM-22 silica/alumina zeolite with zeolite crystals sized from about 50 to about 500 nm, and a nano ZSM-23 silica/alumina zeolite with zeolite crystals sized from about 50 to about 500 nm.

11. The method according to claim 1, where the lighter distillate fractions include at least one component selected from the group consisting of: naphtha, kerosene, diesel, and fuel oil.

12. The method according to claim 1, where the olefins include at least one component selected from the group consisting of: ethylene, propylene, and butenes.

13. The method according to claim 1, further comprising the step of regenerating the nano-zeolite catalyst to remove coke after the step of heating, the step of regenerating comprising heating the nano-zeolite catalyst under air at between about 650° C. to about 750° C. for between about 3 hours to about 5 hours.

14. The method according to claim 13, further comprising the step of measuring $CO_2$ content to determine completion of the step of regenerating the nano-zeolite catalyst.

15. The method according to claim 1, where the step of combining includes stirring the heavy oil feed and naphtha-based cracking additive with a stirrer at between about 50 rpm and about 1500 rpm for between about 1 hour and about 2 hours.

16. The method according to claim 1, where the upgraded product comprises between about 5-15 wt. % hydrogen gas, about 30-70 wt. % olefin gas, and about 5-50 wt. % lighter distillate fractions.

17. The method according to claim 1, where the step of heating is carried out without hydrogen addition and with water addition at about 2 to about 4 times the liquid hourly space velocity of the mixed heavy oil feed for steam.

18. The method according to claim 1, where the nano-zeolite catalyst to mixed heavy oil feed weight ratio is from about 0.5:4 to about 0.5:12.

19. The method according to claim 1, further comprising a first step of separating the lighter distillate fractions from a first aqueous phase and a second step of separating the lighter distillate fractions from a second aqueous phase.

20. The method according to claim 19, where the first step of separating the lighter distillate fractions from the first aqueous phase comprises the use of an inline centrifuge.

* * * * *